United States Patent
Kurz

(10) Patent No.: US 11,182,978 B1
(45) Date of Patent: Nov. 23, 2021

(54) RENDERING VIRTUAL CONTENT WITH COHERENT VISUAL PROPERTIES

(71) Applicant: Apple Inc., Cupertino, CA (US)

(72) Inventor: Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/851,259

(22) Filed: Apr. 17, 2020

Related U.S. Application Data

(60) Provisional application No. 62/838,415, filed on Apr. 25, 2019.

(51) Int. Cl.
*G06T 5/00* (2006.01)
*G06T 19/00* (2011.01)
*G06T 19/20* (2011.01)

(52) U.S. Cl.
CPC ............ *G06T 19/20* (2013.01); *G06T 5/002* (2013.01); *G06T 19/006* (2013.01); *G06T 2207/20204* (2013.01)

(58) Field of Classification Search
CPC ......... G06T 19/20; G06T 5/002; G06T 13/60; G06T 19/006; G06T 2207/202
See application file for complete search history.

(56) References Cited

U.S. PATENT DOCUMENTS

| | | | |
|---|---|---|---|
| 10,610,775 B1* | 4/2020 | Ebert | G06F 3/013 |
| 2016/0125656 A1* | 5/2016 | James | G02B 27/0101 |
| | | | 345/633 |
| 2016/0267720 A1* | 9/2016 | Mandella | G06F 1/1686 |
| 2017/0196260 A1 | 7/2017 | Kobal et al. | |
| 2017/0206693 A1 | 7/2017 | Sharma et al. | |
| 2019/0139321 A1* | 5/2019 | Kocharlakota | G06F 3/011 |

OTHER PUBLICATIONS

Brouchoud, Jon, "Scanning Reality into Virtual Reality", Arch Virtual, Jun. 15, 2015, pp. 1-9.

* cited by examiner

*Primary Examiner* — Diane M Wills
(74) *Attorney, Agent, or Firm* — Thompson Hine LLP

(57) ABSTRACT

Various implementations disclosed herein render virtual content while accounting for air-born particles or lens-based artifacts to improve coherence or to otherwise better match the appearance of real content in the images with which the virtual content is combined.

21 Claims, 6 Drawing Sheets

RENDERING VIRTUAL CONTENT WITH COHERENT VISUAL PROPERTIES

CROSS-REFERENCE TO RELATED APPLICATIONS

This application claims the benefit of U.S. Provisional Application Ser. No. 62/838,415 filed Apr. 25, 2019, which is incorporated herein in its entirety.

TECHNICAL FIELD

The present disclosure generally relates to providing content on electronic devices, and in particular, to systems, methods, and devices for providing content that includes image content and virtual content while accounting for air-born particles and lens-based artifacts.

BACKGROUND

Some augmented reality (AR) systems capture a video stream and combine images of the video stream with virtual content. The images of the video stream can include rain, dust, and other air-born particles and may include lens flare, scattered light, and other lens-based artifacts that appear in front of mountains, people, and other real objects in the images. Virtual content added to such images will generally lack the air-born particles and lens-based artifacts and thus may appear incoherent. The virtual content may appear to float, look detached, stand out, or otherwise fail to fit with the real content. For example, FIG. 4 depicts image 402 in which real objects are partially obscured by falling rain while the virtual content 404 is not obscured by falling rain and thus appears incoherent. Similarly, FIG. 5 depicts image 508 in which real objects are partially obscured by lens flare 504, 506 while the virtual content 510 is not obscured by lens flare 504, 506 and thus appears incoherent. Existing systems and techniques do not adequately account for air-born particles and lens-based artifacts in presenting virtual content with image content in AR and other content that combines virtual content with real image content.

SUMMARY

As discussed above, existing systems and techniques do not adequately account for air-born particles and lens-based artifacts in presenting virtual content with captured image content. Various implementations disclosed herein include devices, systems, and methods for rendering virtual content with air-born particles and lens-based artifacts that are similar to or that otherwise better match those found in the images with which the virtual content is combined.

Some implementations involve providing computer-generated reality (CGR) content that includes virtual content combined with image content of a real physical environment with rain, snow or other air-born particles in front so that the virtual content appears more realistic/consistent with the real rain, snow, or other particles in the real physical environment. In some implementations, an electronic device uses a processor to perform a method that determines a characteristic of real air-born particles (e.g., rain, sleet, snow, fog, sand, dust, smoke, etc.) from an image of a physical environment. Such an image may be captured by a camera on the same or a different device as the device performing the method. The characteristic may be the appearance of the air-born particles or attributes of the air-born particles, e.g., size, density, movement, etc.

The method synthesizes an image of computer-generated air-born particles (e.g., rain, haze, smog, fog, sandstorm, etc.) based on the characteristic of the real air-born particles. Some implementations use an image-based synthesizing approach that may involve deriving clean background image (e.g., without the air-born particles) and then subtracting the clean image from the original image to produce a particle streak image. Some implementations use a model-based synthesizing approach, for example, using a parameterized model to produce computer-generated air-born particles based on parameters identified from the original image. Example parameters for rain include, but are not limited to, rain density, rain intensity, rain drop length, rain drop width, rain uniformness, rain angle, rain velocity. Synthesizing the image of computer-generated air-born particles may involve synthesizing a relatively small patch (e.g., smaller than the virtual content) that will be repeated to cover the exposed/displayed area of the virtual content. In some implementations, the synthesizing accounts for the depth of the virtual content from the camera, e.g., scaling density/size of particles based on depth or using a parameterized model that produces output as a function of depth.

The method displays CGR content depicting the physical environment and virtual content, where the appearance of the virtual content is based on the image of the computer-generated air-born particles. In some implementations, displaying the CGR content involves layering the image of computer-generated air-born particles above/over the virtual content. In some implementations, displaying the CGR content involves using a mask to apply air-born particles (e.g., rain) to only the virtual content.

Some implementations involve providing CGR content that includes virtual content combined with image content of a real physical environment with lens-based artifacts such lens flare in front so that the virtual content appears more coherent with the real physical environment. In some implementations, an electronic device uses a processor to perform a method that determines a characteristic of a real lens-based artifact (e.g., lens flare, lens-scattered light due to cracks, fingerprints, dust, dirt, and imperfections, etc.) from an image of a physical environment and synthesizing an image of computer-generated lens-based artifact based on the characteristic. The characteristic may be the appearance of the artifact or attributes of the artifact, e.g., size, location, diameter, etc.

The method displays CGR content depicting the physical environment and virtual content, where the appearance of the virtual content is based on the image of the computer-generated lens-based artifact. In some implementations, the method adds the lens-based artifact in front of the virtual content and ensures that the added lens-based artifact aligns with the real lens-based artifact by matching or blending. In some implementations, the method removes the lens-based artifact from the original image and adds a computer-generated lens-based artifact in front of both the real and virtual content.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
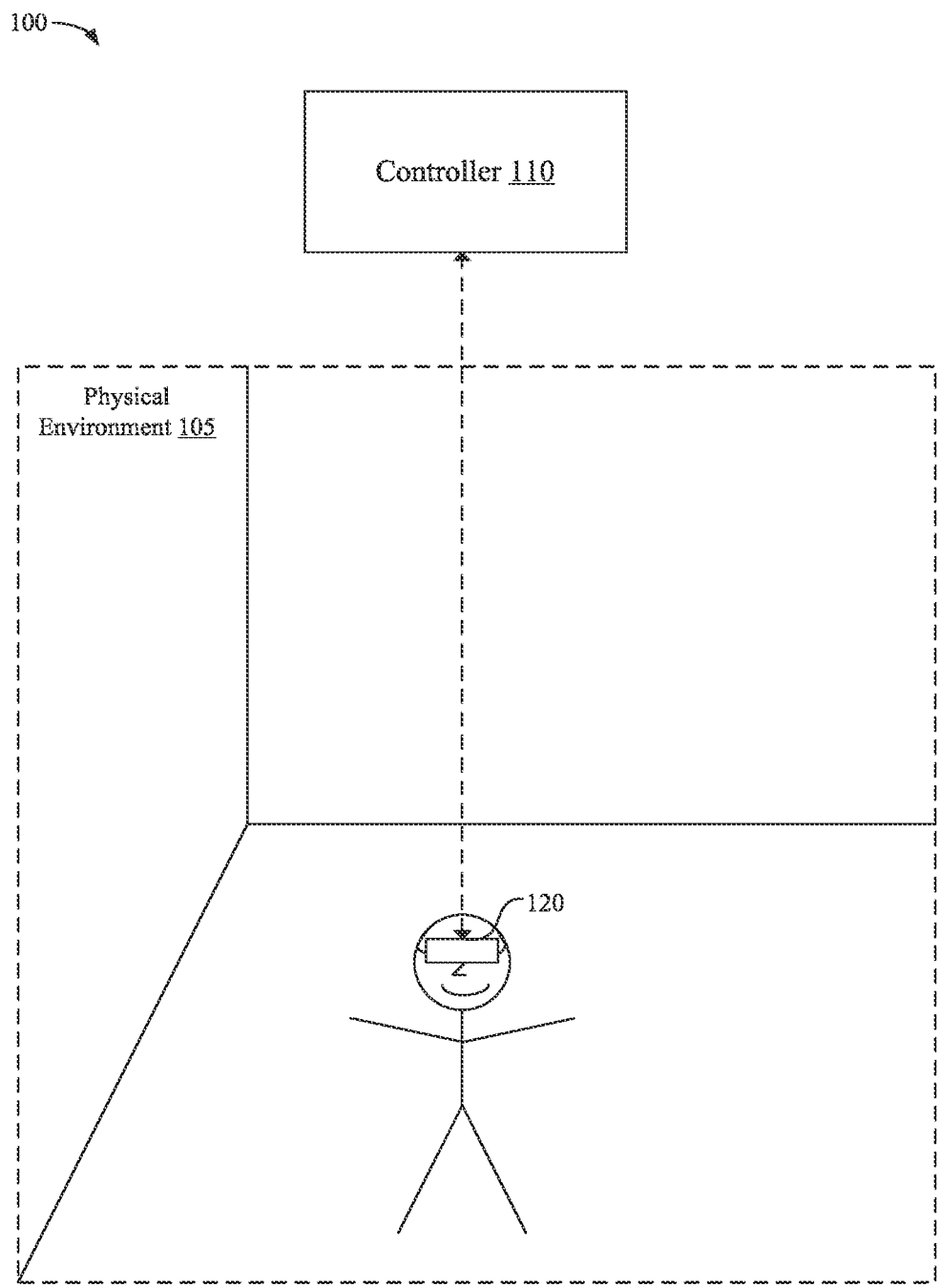
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
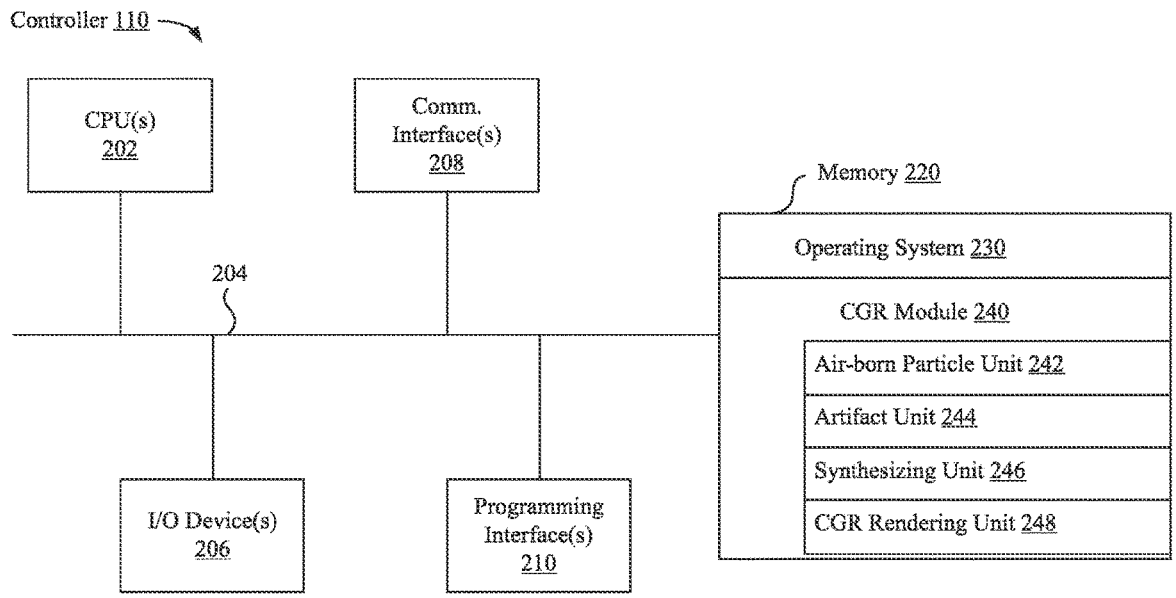
FIG. 2 is a block diagram of an example controller in accordance with some implementations.
Figure 3:
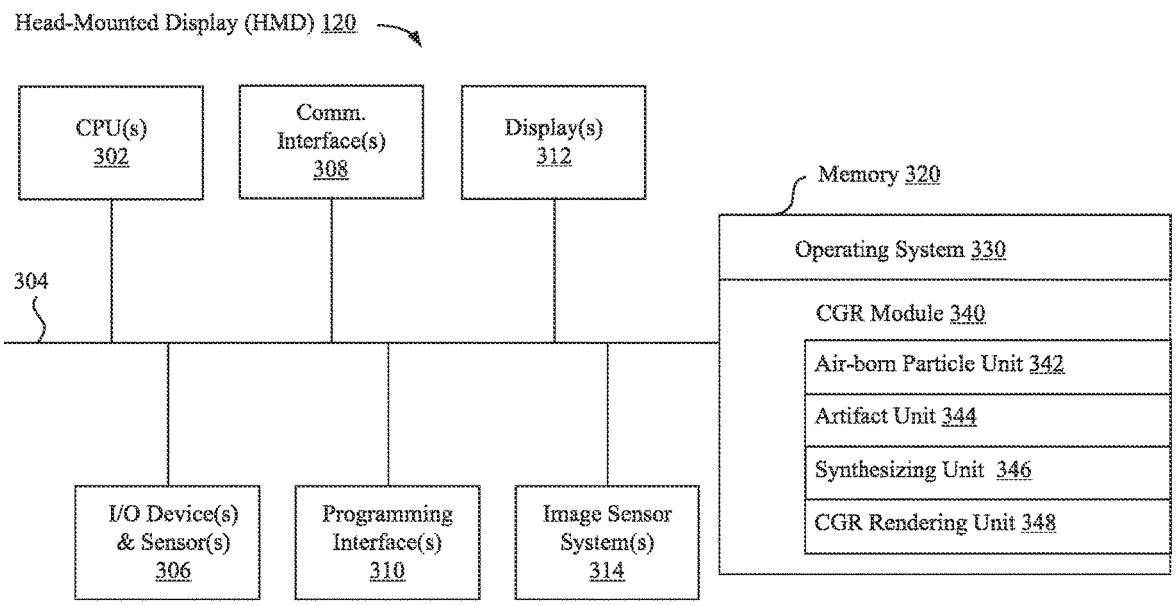
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a physical world that people can sense and/or interact with or without the aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the CGR experience to the user. In some implementations, the HMD 120 includes a suitable combination of software, firmware, or hardware. The HMD 120 is described in greater detail below with respect to FIG. 3. In some implementations, the functionalities of the controller 110 are provided by or combined with the HMD 120, for example, in the case of an HMD that functions as a stand-alone unit.

According to some implementations, the HMD 120 presents a computer-generated reality (CGR) experience to the user while the user is present within the physical environment 105. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual contents simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual content(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual contents with which a person may sense and/or interact. For example, computer-generated imagery of trees, buildings, and avatars representing people are examples of virtual contents. A person may sense and/or interact with virtual contents in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual contents). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual contents to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual contents are superimposed over a physical environment, or a representation thereof. For example, an electronic system for presenting an AR environment may have a transparent or translucent display through which a person may directly view the physical environment. The system may be configured to present virtual contents on the transparent or translucent display, so that a person, using the system, perceives the virtual contents superimposed over the physical environment. Alternatively, a system may have an opaque display and one or more imaging sensors that capture images or video of the physical environment, which are representations of the physical environment. The system composites the images or video with virtual contents, and presents the composition on the opaque display. A person, using the system, indirectly views the physical environment by way of the images or video of the physical environment, and perceives the virtual contents superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual contents into the physical environment, for example, as a hologram or on a physical surface, so that a person, using the system, perceives the virtual contents superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual content may adopt a shape or color of a physical article imaged by one or more imaging sensors. As a further example, a virtual content may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual contents into the physical environment, for example, via a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks. In some implementations, the computer-generated reality (CGR) module 240 includes an air-born particle unit 242, an artifact unit 244, a synthesizing unit 246, and a CGR rendering unit 248.

The air-born particle unit 242 is configured to identify characteristics of real air-born particles depicted in one or more images so that appropriate air-born particles can be synthesized for virtual content. In some implementations, the air-born particle unit 242 is configured to determine an air-born particle image by identifying a clean background image from a source image and then subtracting that clean background image from the source image, e.g., leaving only the air-born particles in the air-born particle image. In other implementations, the air-born particle unit 242 assesses one or more images of a physical setting to identify parameters for a model that will be used to synthesize appropriate air-born particles for virtual content.

The artifact unit 244 is configured to identify characteristics of lens-based artifacts (e.g., lens flare and other artifacts caused by camera imperfections) depicted in one or more images so that appropriate lens-based artifacts can be synthesized for virtual content. In some implementations, the artifact unit 244 is configured to determine a lens-based artifact image by identifying a clean background image from a source image and then subtracting that clean background image from the source image, e.g., leaving only the lens-based artifact in the lens-based artifact image. In other implementations, the artifact unit 244 assesses one or more images of a physical setting to identify parameters for a model that will be used to synthesize appropriate lens-based artifacts for virtual content.

The synthesizing unit 246 synthesizes air-born particles or lens-based artifacts for virtual content. In some implementations, the synthesizing unit applies a mask to create an image of air-born particles or lens-based artifacts at only certain image locations, e.g., the locations that will be in front of the virtual content. In some implementations, the synthesizing unit uses a machine learning model such as a neural network to generate an image of air-born particles or lens-based artifacts. Such a machine learning model can account for the depth of the object in front of which the air-born particles or lens-based artifacts will appear.

The CGR rendering unit 248 combines image content with virtual content to provide a CGR experience, e.g., providing a view of a CGR environment for a user. In some implementations, the CGR rendering unit adds air-born particles or lens-based artifacts to the virtual content (e.g., in front of the virtual content) that are similar to those of the image content with which the virtual content is being combined.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks. In some implementations, the computer-generated reality (CGR) module 340 includes an air-born particle unit 342, an artifact unit 344, a synthesizing unit 346, and a CGR rendering unit 348.

The air-born particle unit 342 is configured to identify characteristics of real air-born particles depicted in one or more images so that appropriate air-born particles can be synthesized for virtual content. In some implementations, the air-born particle unit 342 is configured to determine an air-born particle image by identifying a clean background image from a source image and then subtracting that clean background image from the source image, e.g., leaving only the air-born particles in the air-born particle image. In other implementations, the air-born particle unit 342 assesses one or more images of a physical setting to identify parameters for a model that will be used to synthesize appropriate air-born particles for virtual content.

The artifact unit 344 is configured to identify characteristics of lens-based artifacts (e.g., lens flare and other artifacts caused by camera imperfections) depicted in one or more images so that appropriate lens-based artifacts can be synthesized for virtual content. In some implementations, the artifact unit 344 is configured to determine a lens-based artifact image by identifying a clean background image from a source image and then subtracting that clean background image from the source image, e.g., leaving only the lens-based artifact in the lens-based artifact image. In other implementations, the artifact unit 344 assesses one or more images of a physical setting to identify parameters for a model that will be used to synthesize appropriate lens-based artifacts for virtual content.

The synthesizing unit 346 synthesizes air-born particles or lens-based artifacts for virtual content. In some implementations, the synthesizing unit applies a mask to create an image of air-born particles or lens-based artifacts at only certain image locations, e.g., the locations that will be in front of the virtual content. In some implementations, the synthesizing unit uses a machine learning model such as a neural network to generate an image of air-born particles or lens-based artifacts. Such a machine learning model can account for the depth of the object in front of which the air-born particles or lens-based artifacts will appear.

The CGR rendering unit 348 combines image content with virtual content to provide a CGR experience, e.g., providing a view of a CGR environment for a user. In some implementations, the CGR rendering unit adds air-born particles or lens-based artifacts to the virtual content (e.g., in front of the virtual content) that is similar to those of the image content with which the virtual content is being combined.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Air-Born Particle Example

Figure 4:
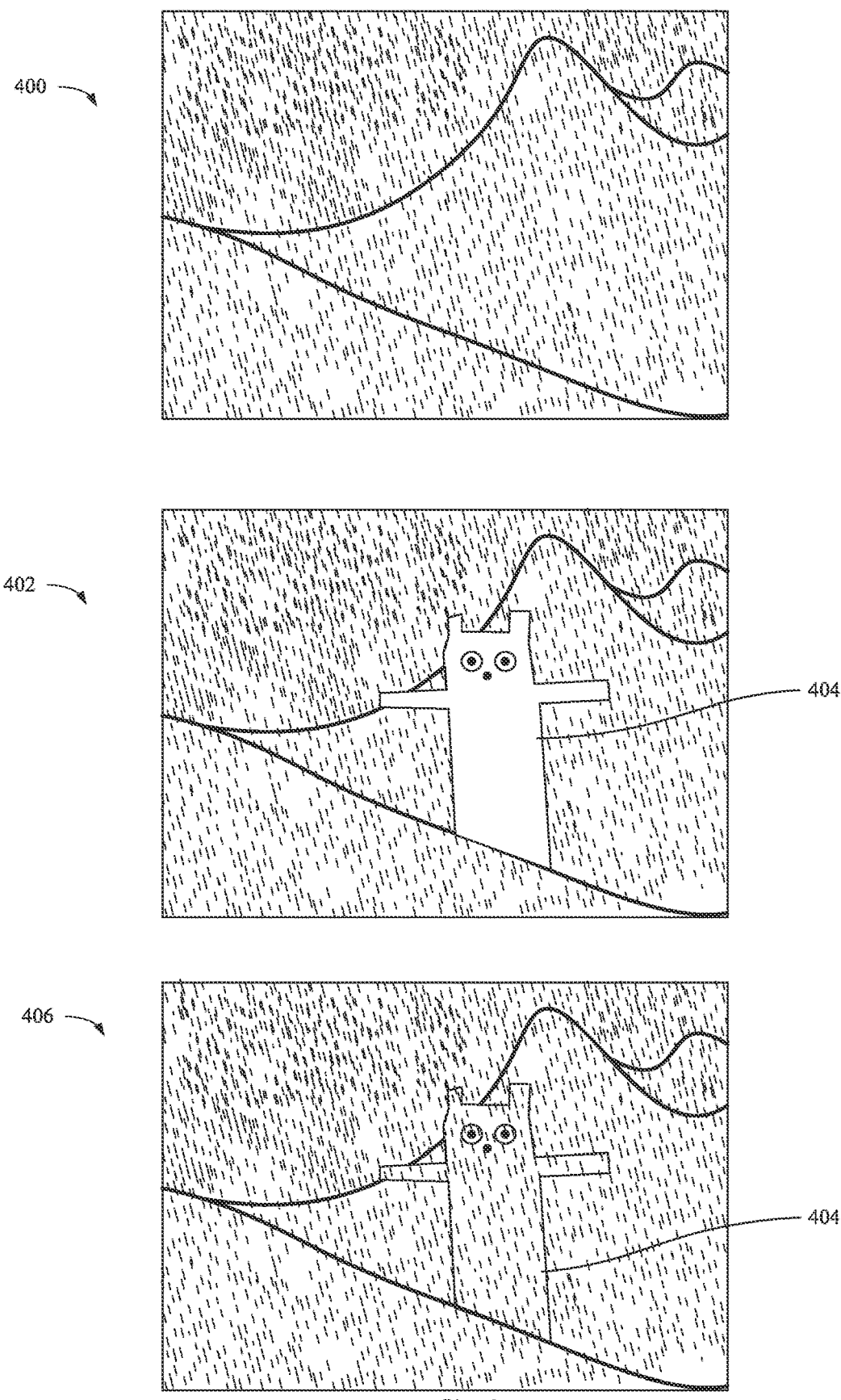
FIG. 4 illustrates CGR content in which the virtual content is presented without accounting for air-born particles and CGR content in which the virtual content is presented while accounting for air-born particles.

FIG. 4 illustrates CGR content in which the virtual content is presented without accounting for air-born particles and CGR content in which the virtual content is presented while accounting for air-born particles. In this example, original image 400 depicts a physical environment (e.g., hills, mountains, etc.) on a rainy day. The original image 400 may been captured by a camera on an HMD or other electronic device for use in providing a CGR environment. Image 402 illustrates CGR content based on the image 400 with virtual content 404 added. While there is rain in front of other portions of the image 402, there is no rain in front of the virtual content 404, making this virtual content appear incoherent with the rest of the image 402. The virtual content 404 may appear to float, look detached, stand out, or otherwise fail to fit with the real content.

In some implementations, the problem of virtual content superimposed on an image of a real, rainy physical environment not looking realistic is solved by determining from the image of the real physical environment the characteristics of the rain (strengths, direction, . . . ), synthesizing an image of rain with the same characteristics, and compositing the virtual content with the synthetic rain image before displaying it. Accordingly, as depicted in image 406, the CGR content includes the virtual content 404 with rain in front, providing a more coherent CGR experience. The rain is similar in front of both real and virtual content. A similar technique may be used to add realistic haze, smog, fog, sand, smoke, and other air-born particles.

Lens-Based Artifact Example

Figure 5:
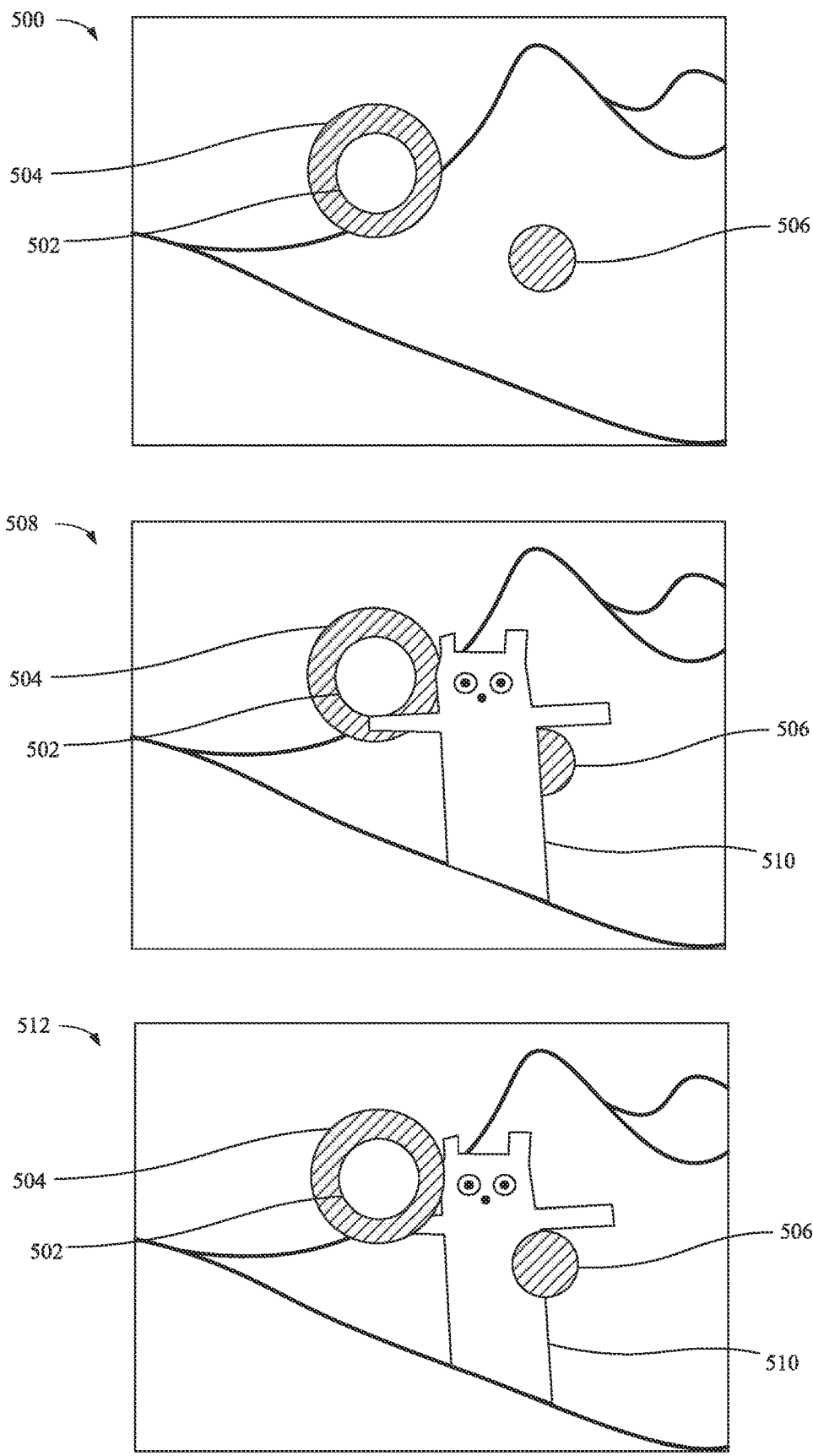
FIG. 5 illustrates CGR content in which the virtual content is presented without accounting for lens-based artifacts and CGR content in which the virtual content is presented while accounting for lens-based artifacts.

FIG. 5 illustrates CGR content in which the virtual content is presented without accounting for lens-based artifacts and CGR content in which the virtual content is presented while accounting for lens-based artifacts. In this example, original image 500 depicts a physical environment (e.g., hills, mountains, etc.) on a sunny day. Light from the sun 502 results in lens flare 502 and 506 appearing in the original image 500. The original image 500 may be captured by a camera on an HMD or other electronic device for use in providing a CGR environment. Image 508 illustrates CGR content based on the image 500 with virtual content 404 added. While there is lens flare in front of other portions of the image 508, there is no lens flare in front of the virtual content 510, making this virtual content 510 appear incoherent with the rest of the image 508. The virtual content 510 may appear to float, look detached, stand out, or otherwise fail to fit with the real content.

In some implementations, the problem of virtual content superimposed on an image of a real, physical environment which has artifacts resulting from scattered light in the lens system not looking realistic is solved by determining, from the image of the real physical environment, the characteristics of the artifact (e.g., lens flares), synthesizing an image of the artifact with the same characteristics, and compositing the virtual content with the synthetic artifact image before displaying it. Accordingly, as depicted in image 512, the CGR content includes the virtual content 510 with lens flare 504, 506 in front, providing a more coherent CGR experience. A similar technique may be used to account for other lens-based artifacts including, but not limited to, those due to lens imperfections, cracks, fingerprints, dirt on/in lens, smudge, dust, etc.

Exemplary Air-Born Particle Method

Figure 6:
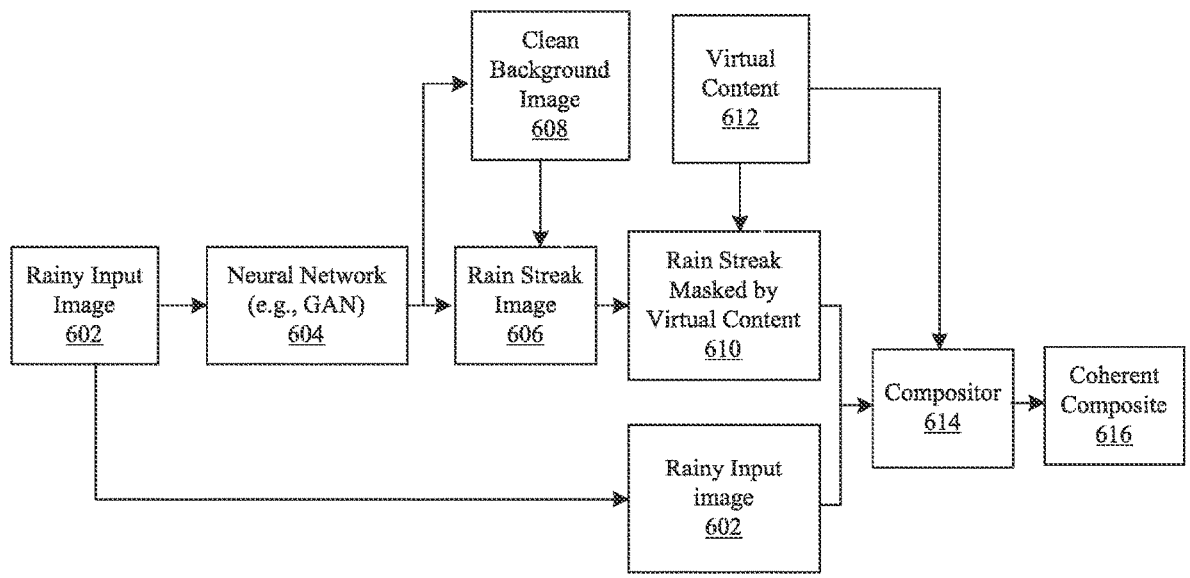
FIG. 6 is a flowchart illustrating an exemplary method for rendering CGR content that includes virtual content that accounts for air-born particles, according to some implementations.

FIG. 6 is a flowchart illustrating an exemplary method for rendering CGR content that includes virtual content that accounts for air-born particles; rain drops in this example. In FIG. 6, a rainy input image 602 is input to a neural network 604 that was trained to separate a clean background image 608 from the rainy input image, e.g., altering the image to remove the appearance of rain drops. The clean background image 608 is used to create a rain streak image 606. For example, the clean background image 608 may be subtracted from the rainy input image 602 to produce the rain streak image 606. Other filtering, machine learning, or other existing or to-be-developed techniques for de-raining, de-hazing, or otherwise producing a clean image without depictions of air-born particles may similarly be used to produce clean images that can then be used to identify air-born particles.

In some implementations, a machine learning model is trained, given an image or part of an image, to regress to a) only the rain streak image 606, b) a rain streak tile (e.g., smaller than the image), or c) parameters for a rain model. In some implementations, the neural network 604 is trained to directly produce rain streak images from rainy input images, without necessarily producing clean background images. In other implementations, the neural network 604 is trained to directly produce a rain streak patch (e.g., a tile) that has an area that is smaller than the image area. Such a patch can be repeated, modified and repeated, or otherwise used to create a rain streak area of sufficient size to be positioned in front of the virtual content 612.

In other implementations, a machine learning model is trained, given an image or part of an image, to regress to parameters of a rain model, e.g., a model that produces a rain streak image or rain streak patch (e.g., tile) having rain with appropriate characteristics based on the real rain. Example parameters include, but are not limited to, density, intensity, lengths, width, uniformness, angle, velocity, etc. Thus, some implementations use a method that, given one or more rain streak images, is configured to estimate parameters of a rain model and use this model to synthesize rain following the current rain's characteristics.

In FIG. 6, a trained neural network is used in producing a rain streak image. Similar techniques can generally be used to create particle streak images that separate air-born particles depicted in input images from other, clean portions of the input images.

In the method of FIG. 6, the rain streak image 606 is used to create the masked rain streak content 610 using virtual content 612. While the rain streak image 606 may depict rain for all areas (e.g., all pixels) of image space, the masked rain streak content 610 may only depict rain in locations corresponding to the virtual content 612 that will be added. For example, the rain streak content masked by virtual content 610 may correspond to only the image area corresponding to the virtual content 404 in FIG. 4.

The masked rain streak content 610, the rainy input image 602, and the virtual content 612 are input to compositor 614, which combines these inputs to produce coherent composite 616. In some implementations, the virtual content 612 is layered on top of the rainy input image 602, and the masked rain streak content 610 is layered on top of the virtual content. The result is a CGR content that includes depictions of the physical environment with real rain in front of it and virtual content 612 with simulated rain in front of it. In this example, the simulated rain that is added in front of the virtual content 612 was created based on the real rain depicted in the rainy input image 602 and thus may have characteristics that are the same as or similar to those of the real rain depicted in the scene.

The appearance of close objects (real and virtual) may be less affected by air-born particles than the appearance of far-away objects is affected by air-born particles. To account for this, in some implementations, the rain streak image 606 is determined based on the depth of the virtual content 610 to which it will be applied, e.g., based on the distance of the virtual content from the camera. In some implementations, a static depth of the background of the physical environment is assumed or estimated (e.g., 100 meters) and the rain streak image is produced accordingly, e.g., so that objects at 50 meters will rain that has density and size based on the relationship of the 50 meter depth to the 100 meter background depth. In this example, the characteristics of the rain are adjusted proportionally based on the depth. In other example, the characteristics are adjusted using other depth-based relationships. Generally, a given particle streak image may have depth-dependent parameters (e.g., density, size) that are used to adjust its appearance. In some implementations, the depth of real objects in the physical setting is estimated given single observation (deep learning single image depth estimation) or multiple observations (stereo, multi-view stereo, SLAM, structure form motion (SfM)), and this information (along with the intended depth/position of virtual content 612) is used in producing a rain streak image 606 with appropriate characteristics. In some implementations, the method determines rain streak or rain characteristics for particular depths (e.g., 10 feet, 20 feet, 30 feet, etc.) and then interpolates for virtual content depths in between those fixed depths.

In some implementations, the neural network 604 is trained to receive an input image having air-born particles and generate particle streak images for different virtual content depths. Thus, the neural network 604 may produce a rain streak image having less rain for a virtual content 612 where it will be positioned at a depth of 3 feet than for virtual content 612 where it will be positioned at a depth of 200 feet. Thus, in some implementations, the method uses a model that is configured to solve (e.g., produce rain streak output) as function of depth.

In some implementations, the method of FIG. 6 is performed on each frame of a sequence of frames of a video used to produce CGR content. In other implementations, the method is performed on fewer than all frames, for example, to conserve system resources or improve performance. In some implementations, a rain streak image is reused for multiple frames, e.g., 5 frames in a row, 10 frames in a row, etc. In some implementations, a rain streak image 606 that is produced using one rainy input image 602 is altered for each subsequent image for which it is used. For example, the rain streak image 606 may be altered to translate depicted rain drops to account for the impact of gravity over time. In some embodiments, an accelerometer, a gyroscope, or an inertial measurement unit (IMU) may be used to determine the direction of gravity relative to the camera that captured the image to determine the direction of translation of reused rain streak images to account for the impact of gravity over time.

Re-used rain stream images may similarly be adjusted to account for user/device movements. Thus, if the user moves slightly to his or her right, the rain streak image may be adjusted accordingly so that the user experience is coherent. In some implementations, the method estimates the camera pose (position and orientation) for each frame and accounts for changes in camera pose over time in adjusting particle streak images that are reused for multiple frames, e.g., accounting for changes in position, rotation, roll axis, etc. The air-born particles can be adjusted to remain in the same world space, e.g., so that rain drops do not appear to jump sideways to the user. To do so may involve globally or locally applying a perspective homography, affine homography, similarity transform, or 2D rotation.

Figure 7:
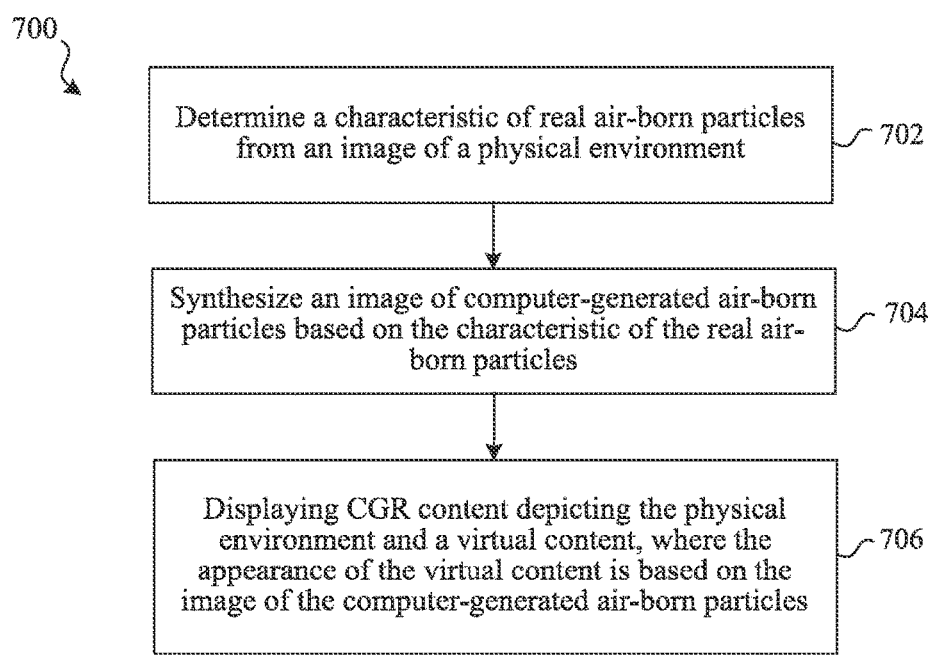
FIG. 7 is a flowchart illustrating another exemplary method for rendering CGR content that includes virtual content that accounts for air-born particles, according to some implementations.

FIG. 7 is a flowchart illustrating another exemplary method 700 for rendering CGR content that includes virtual content that accounts for air-born particles. In some implementations, the method 700 is performed by a device (e.g., controller 100 or HMD 120 of FIGS. 1-3). The method 700 can be performed at a mobile device, head mounted device (HMD), desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 702, the method 700 determines a characteristic of real air-born particles (e.g., rain, sleet, snow, fog, sand, dust, smoke, etc.) from an image of a physical environment. The image may have been captured by a camera on the device or a camera on another device, e.g., a separate controller, server, or other device. The image may have been captured as a frame of video to be used in providing a CGR experience.

At block 704, the method 700 synthesizes an image of computer-generated air-born particles based on the characteristic of the real air-born particles. Some implementations involve an image-based approach in which a clean image is derived and then subtracted from the input image to produce an air-born particle streak image. Such a clean image may be produced using filters, machine learning models, or any other appropriate technique. Some implementations involve a model-based approach that uses a parameterized model to produce computer-generated air-born particles (e.g., an image of such air-born particles) based on parameters identified from the image. A neural network or other machine learning model may be used to identify parameters including, but not limited to, density, intensity, length, width, uniformness, angle, and velocity.

In some implementations, the image of computer-generated air-born particles corresponds to the entire size (e.g., all pixels) of the input image. In other implementations, the image of computer-generated air-born particles corresponds to a small patch (e.g., tile) that may be repeated for larger areas as needed. As discussed with respect to FIG. 6, synthesizing an image of computer-generated air-born particles may account for the depth of the virtual content, e.g., scaling density/size of particles based on depth or a model could be used that produces output as a function of depth.

At block 706, the method 700 displays CGR content depicting the physical environment and a virtual content, where the appearance of the virtual content is based on the image of the computer-generated air-born particles. In some implementations this involves layering the image of computer-generated air-born particles above the virtual content. In some implementations, a mask is used to apply the air-born particle to only the virtual content.

In some implementations, the method 700 is used to produce CGR content for multiple frames. In some implementations, the technique is optimized over multiple frames. For example, given 60 or 90 fps content, the method 700 may estimate an image of computer-generated air-born particles for one frame per second. The image of computer-generated air-born particles may then be used for the intervening frames. For example, for the image-based approach, this may involve transforming the image of computer-generated air-born particles to account for gravity and camera pose change. For the model-based technique, this may involve only updating model parameters once a minute and making appropriate adjustments for the intervening frames.

Figure 8:
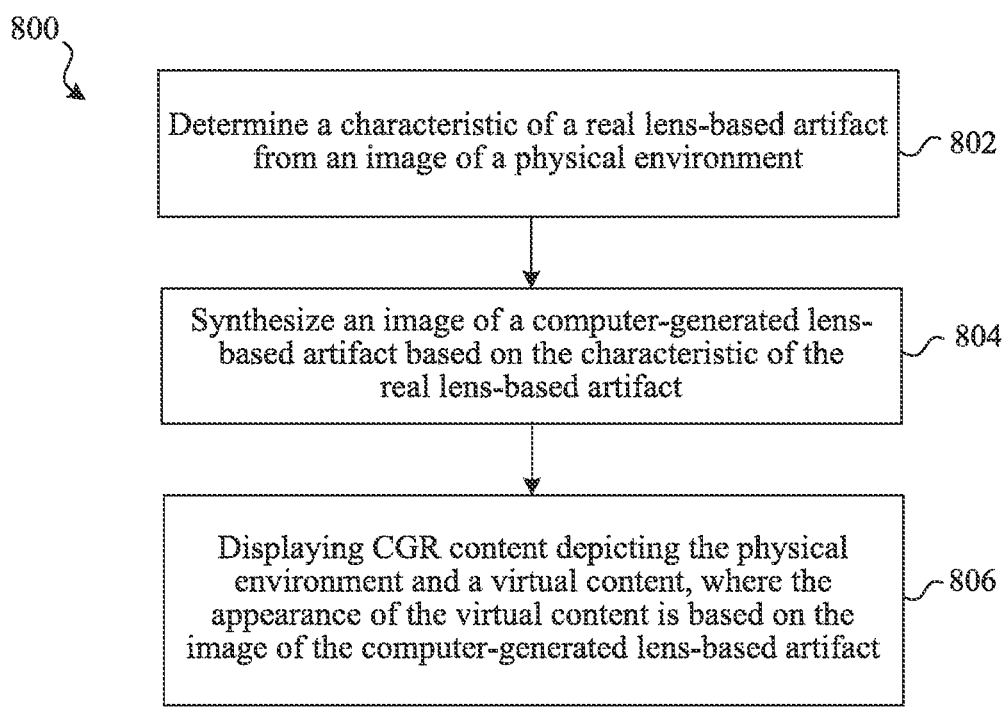
FIG. 8 is a flowchart illustrating an exemplary method for rendering CGR content that includes virtual content that accounts for lens-based artifacts, according to some implementations.

FIG. 8 is a flowchart illustrating an exemplary method for rendering CGR content that includes virtual content that accounts for lens-based artifacts, according to some implementations. In some implementations, the method 800 is performed by a device (e.g., controller 100 or HMD 120 of FIGS. 1-3). The method 800 can be performed at a mobile device, head mounted device (HMD), desktop, laptop, server device, or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 802, the method 800 determines a characteristic of a real lens-based artifact (e.g., lens flare) from an image of a physical environment. The image may have been captured by a camera on the device or a camera on another device, e.g., a separate controller, server, or other device. The image may have been captured as a frame of video to be used in providing a CGR experience.

At block 804, the method 800 synthesizes an image of a computer-generated lens-based artifact based on the characteristic of the real lens-based artifact. Some implementations involve an image-based approach in which a clean image is derived and then subtracted from the input image to produce an artifact image. Such a clean image may be produced using filters, machine learning models, or any other appropriate technique. Some implementations involve a model-based approach that uses a parameterized model to produce computer-generated artifacts (e.g., an image of such artifacts) based on parameters identified from the image. A neural network or other machine learning model may be used to identify parameters including, but not limited to, lens flare center, lens flare shape, lens flare diameter, lens flare opacity, etc.

At block 806, the method 800 displays CGR content depicting the physical environment and a virtual content, where the appearance of the virtual content is based on the image of the computer-generated lens-based artifact. In some implementations this involves layering the lens-based artifact in front of the virtual content and ensuring the added lens-based artifact aligns with real lens-based artifact by matching or blending. For example, it may involve positioning an image of a computer-generated lens-based artifact by aligning a visual attribute of the real lens-based artifact with a visual attribute of the computer-generated lens-based artifact, e.g., so that the perimeter of a circular lens-based artifact appears continuous rather than disjointed. In some implementations, the displaying involves removing the real lens-based artifacts from the image of the physical environment and adding computer-generated a lens-based artifact in front of both real and virtual content.

In some implementations, the method 800 is used to produce CGR content for multiple frames. In some implementations, the technique is optimized over multiple frames. For example, given 60 or 90 fps content, the method 800 may estimate an image of computer-generated lens-based artifacts for one frame per second. The image of computer-generated lens-based artifacts may then be used for the intervening frames. In some implementations, a lens-based artifact is determined for one frame using a computationally-intensive method and then estimated for one or more subsequent frames using a less intensive method based on tracking (e.g., tracking two points/a line/a ray on lens flare from frame to frame and aligning computer-generated lens-based artifact accordingly).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
    at a device having a processor:
        determining a characteristic of real air-borne particles from an image of a physical environment;
        synthesizing an image of computer-generated air-borne particles based on the characteristic of the real air-borne particles; and
        displaying multiple frames of computer-generated reality (CGR) content depicting the physical environment and a virtual content, wherein an appearance of the virtual content is based on the image of the computer-generated air-borne particles, wherein the computer-generated air-borne particles are in different positions in consecutive frames of the multiple frames.

2. The method of claim 1, wherein synthesizing the image of computer-generated air-borne particles comprises:
    deriving a clean background image; and
    synthesizing the image of computer-generated air-borne particles by subtracting the clean background image from the image.

3. The method of claim 1, wherein synthesizing the image of computer-generated air-borne particles comprises using a parameterized model with a parameter identified from the image.

4. The method of claim 3, wherein the parameter is density, intensity, length, width, uniformness, angle, or velocity.

5. The method of claim 3, wherein the model produces computer-generated particles dependent upon depth.

6. The method of claim 1,
    wherein synthesizing the image of computer-generated air-borne particles comprises generating a patch of air-borne particles and repeating the patch.

7. The method of claim 1, wherein synthesizing the image of computer-generated air-borne particles comprises scaling a density or size of air-borne particles in the image of computer-generated air-borne particles based on depth.

8. The method of claim 1, wherein the computer-generated air-borne particles are reused in the consecutive frames of the multiple frames based on accounting for camera motion or gravity.

9. A method comprising:
    at a device having a processor:
        determining a characteristic of a real lens-based artifact from an image of a physical environment;
        synthesizing an image of computer-generated lens-based artifact based on the characteristic; and
        displaying multiple frames of computer-generated reality (CGR) content depicting the physical environment and a virtual content, wherein an appearance of the virtual content is based on the image of the computer-generated lens-based artifact, wherein the computer-generated lens-based artifact is in different positions in consecutive frames of the multiple frames.

10. The method of claim 9, wherein the image of computer-generated lens-based artifact is added in front of the virtual content.

11. The method of claim 10 further comprises positioning the image of the computer-generated lens-based artifact by aligning a visual attribute of the lens-based artifact with a visual attribute of the computer-generated lens-based artifact.

12. The method of claim 9, wherein displaying the CGR object comprises removing the lens-based artifact from image of real content and adding the computer-generated lens-based artifact in front of real and virtual content.

13. The method of claim 9, wherein:
    a first computer-generated lens-based artifact is determined for a first frame; and
    a second computer-generated lens-based artifact is determined for a subsequent frame following the first frame, the second computer-generated lens-based artifact determined based on the first computer-generated lens-based artifact.

14. The method of claim 13 further comprising tracking an element from the first frame to the subsequent frame and positioning the second computer-generated lens-based artifact based on the tracking.

15. The method of claim 9, wherein the lens-based artifact is lens flare.

16. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
        determining a characteristic of real air-borne particles or a lens-based artifact from an image of a physical environment;
        synthesizing an image of computer-generated air-borne particles or lens-based artifact based on the characteristic of the real air-borne particles or lens-based artifact; and
        displaying multiple frames of computer-generated reality (CGR) content depicting the physical environment and a virtual content, wherein an appearance of the virtual content is based on the image of the computer-generated air-borne particles or lens-based artifact, wherein the computer-generated air-borne particles or lens-based artifact are in different positions in consecutive frames of the multiple frames.

17. The system of claim 16, wherein synthesizing the image of computer-generated air-borne particles or lens-based artifact comprises:
    deriving a clean background image; and
    synthesizing the image of computer-generated air-borne particles or lens-based artifact by subtracting the clean background image from the image.

18. The system of claim 17, wherein synthesizing the image of computer-generated air-borne particles or lens-based artifact comprises using a parameterized model with a parameter identified from the image.

19. The system of claim 16, wherein synthesizing the image of computer-generated air-borne particles or lens-based artifact comprises synthesizing an image of lens flare.

20. The system of claim 19, wherein the operations further comprise positioning the image of the computer-generated lens flare by aligning a visual attribute of real lens flare with a visual attribute of computer-generated lens flare.

21. The system of claim 19, wherein displaying the CGR object comprises removing the lens flare from the image of real content and adding the computer-generated lens flare in front of real and virtual content.

\* \* \* \* \*